Jan. 23, 1923.                               1,443,146.
C. READ.
SNAP FASTENER.
FILED SEPT. 13, 1920.
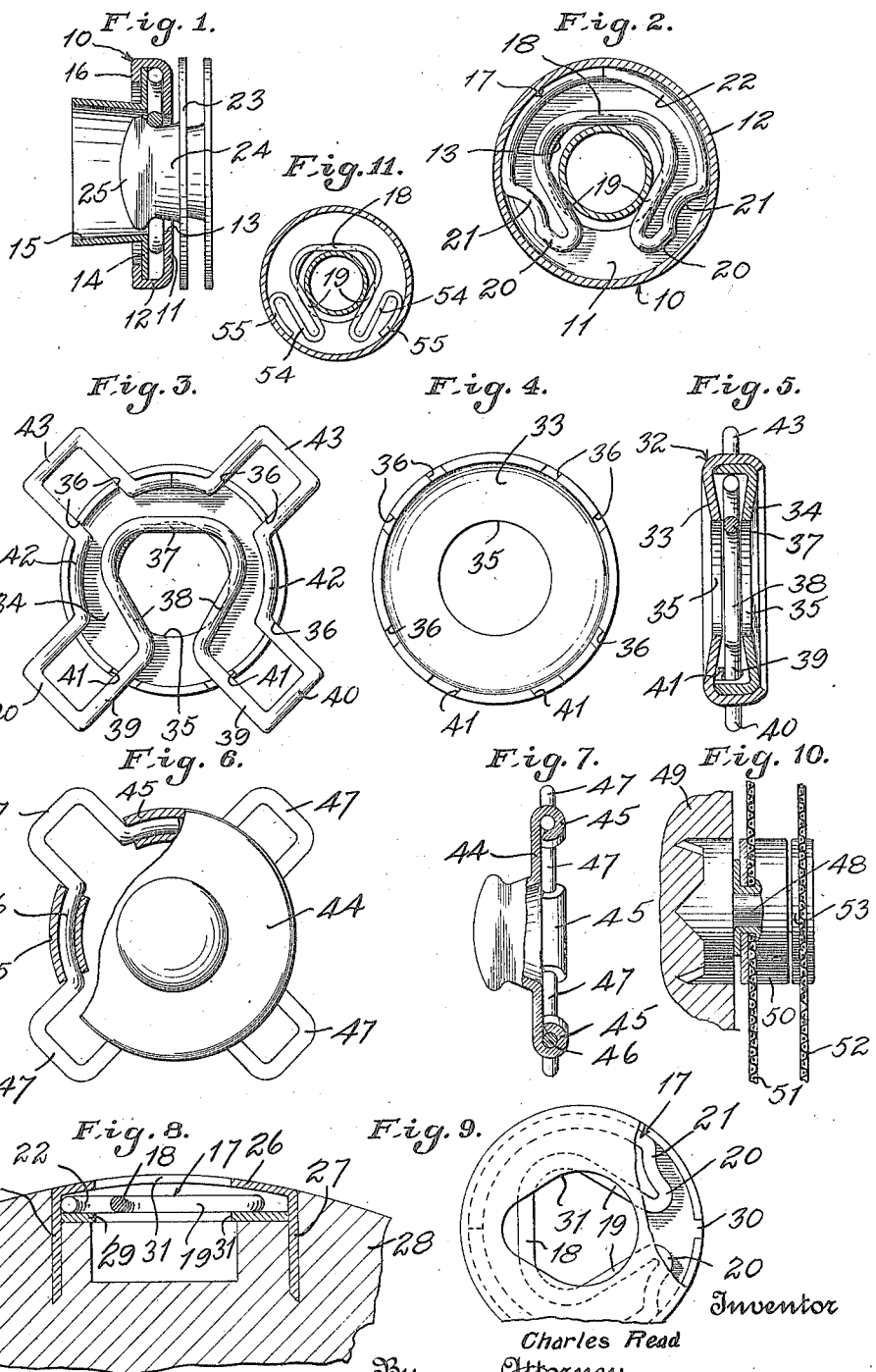
Inventor
Charles Read
By Attorney Patented Jan. 23, 1923.

1,443,146

UNITED STATES PATENT OFFICE.

CHARLES READ, OF BROOKLYN, NEW YORK.

SNAP FASTENER.

Application filed September 13, 1920. Serial No. 409,829.

*To all whom it may concern:*

Be it known that I, CHARLES READ, a citizen of the United States, and resident of Morris Park, borough of Brooklyn, county of Kings, city and State of New York, have invented certain new and useful Improvements in Snap Fasteners.

This invention relates to improvements in snap fasteners and the principal object of the invention resides in the provision of a fastener so designed that it may be easily released and yet the danger of an accidental separating of the parts is avoided.

Another object of the invention is to provide a device which may be easily and cheaply constructed, and in which the springs may be formed of a suitable spring wire or stamped from a flat sheet of material.

Still another object of the invention resides in the provision of a snap fastener which may, with slight modification of construction, be utilized as a glove fastener, a garment fastener, or as a means for securing side curtains in place on a motor vehicle.

A further and more specific object of the invention, resides in the provision of a fastener which, when used as a garment fastener, may, by slight change in the construction of the spring, avoid the necessity of piercing the fastener shell to receive the securing means by which the device is attached to the garment.

With these and other objects in view the invention consists of a novel construction, combination and arrangement of parts which will be fully set forth in the following specification, claimed and illustarted in the accompanying drawings, in which ;—

Fig. 1, is a sectional view through a snap fastener constructed in accordance with this invention.

Fig. 2, is a sectional view at right angles to Fig. 1, through the socket member.

Fig. 3, is a face view of the socket member of a garment fastener showing the cover plate removed.

Fig. 4, is an inner face view of the cover plate.

Fig. 5, is a sectional view through the device when constructed for use on garments.

Fig. 6, is a face view of the stud member of the garment fastener showing portions thereof in section to more clearly illustrate the details of construction.

Fig. 7, is a side view of Fig. 6 showing portions thereof in section.

Fig. 8, is a fragmentary sectional view through the bow member of a vehicle top showing the construction of the socket of this snap fastener adapted for use in connection with the side curtains of vehicles.

Fig. 9, is a face view of Fig. 8, showing a portion broken away to more clearly illustrate the details of construction.

Fig. 10, is a view partly in section of a modified form of the invention showing the fastener in use for securing two curtains one on top of the other and Fig. 11, is a sectional view through the fastener showing a modified form of spring.

Referring to the drawings in detail, the numeral 10 designates in its entirety the shell of the socket member of a glove fasttener which comprises a cup-shaped body 11 having a right angle flange 12 formed on its edge. This body 11 is provided with a central opening 13 to receive the stud member which will be more fully hereinafter described. A cover plate 14 formed with a tubular extension 15 fits within the flange 12 and is held in place by means of an inturned flange 16 at the edge of the flange 12, as will be clearly seen upon reference to Fig. 1.

The socket member thus described is provided with a clamping spring 17 which consists of a bight portion 18 arranged on the inner face of the shell or socket member in such a manner that it intersects the edge of the opening 13. Formed at the opposite ends of the bight portion 18 are the yielding clamping arms 19 which, like the bight portion 18 intersect the edge of the opening 13. These arms are formed at the ends opposite those connected to the bight portion with bent back portions 20 which in turn are formed integrally with the resilient arched members 21 formed on the retaining portion 22 of the spring which lies against the inner side of the flange 12.

The stud member used in connection with the socket member above described is designated by the numeral 23 and comprises a base plate having extending centrally therefrom a tapered neck 24 formed at the extreme upper end with a head 25, which is of a diameter to slip through the opening 13 and the neck 24 is reduced so that the bight portion 18 and the arms 19 of the spring 17 normally lie in planes tangential with the periphery of the neck.

Upon reference to Figs. 8 and 9, it will be seen that the same type of spring is utilized but that the shell 26 differs from the shell 10 in that it is provided with the attaching points 27 which are driven into the bow 28 so that the outer face of the shell lies flush with the outer face of the bow. In this type of device, the backing plate 29 is held against the rotary movement with relation to the shell by means of suitable ears 30 which project into recesses formed in the annular flange of the shell as illustrated in Fig. 9. A further slight difference in the structure resides in the formation of the central opening 31 which is slightly egg-shaped, so that the bight portion 18 of the spring lies wholly within the opening. Obviously the stud which enters this opening is shaped to conform therewith and it has been found through experiment that such formation prevents relative rotary movement of the stud with the socket.

In the type of device used as a garment fastener the spring is formed with a plurality of attaching loops which extend radially therefrom to form eyes through which the securing threads pass. The socket of the garment fastener is designated in its entirety by the numeral 32 and comprises a pair of telescopic cup-shaped members 33 and 34 which are formed with central openings 35 and are provided at their edges with notches or mating slots 36 for the accommodation of the loops of the spring. The spring used in connection with this device consists of a bight portion 37 formed at opposite ends with the clamping jaws 38 and the bight portion and clamping jaws intersect the edge of the openings 35 so that the portions of said bight portion and jaws lie within the confinement of the openings. The jaws are formed at their ends opposite those formed on the bight portion with extensions 39 terminating at their outer ends in loops 40 which extend radially from the socket. As shown in Figs. 3 and 4, the slots 41 through which the extensions 39 project are enlarged to provide holes to permit the jaws to be readily sprung outwardly and avoid binding at this point. The loops 40 are formed with arcuate portions 42 which lie within the flanges of the socket members and similar loops 43 are formed on the arcuate members 42 and extend radially from the socket.

The stud used in connection with the garment fastener structure is best illustrated in Figs. 6 and 7 and comprises a base plate 44 formed at its periphery with a bead 45 in which the arcuate portions 46 of a suitable reinforcing wire lie. This bead is cut away at spaced intervals around the periphery of the base plate and extending through the cut away portions are the radial loops 47 formed of the reinforcing wire 46.

The operation of the fastener is as follows:—Upon the withdrawal of the stud head from the socket, pressure is applied at the upper side or that across which the bight portion of the spring extends. Obviously this portion of the spring may be stationary and the pressure will cause the arms to spring upwardly so that a slight downward movement of the stud head will free the same, and thus permit it to be readily withdrawn. Due to the resilience of the members 21, it will be seen that the spring may be easily manipulated and the head may again be inserted with relative ease. The same is true of the structure illustrated in Fig. 3 as the resilience transmit through the extensions 39 and the loops 40 so that the resiliency is distributed over a relatively large area, and the device will at all times return to its original position. Obviously, in lieu of the wire type of spring, a flat stamped spring may be utilized and the head when in the socket, will be firmly engaged on three sides so that danger of its accidental removal is eliminated.

In the modified form of the device illustrated in Figure 10, the stud number 48 is secured to the bow or other rigid support 49 and an elongated socket member is secured to the inner curtain 51 and received the stud member as clearly shown. The outer curtain 52 carries a stud member 53 which projects into the socket member 50 so that when the device is in place the two curtains will be secured in parallel relation.

In the modification shown in Figure 11 the structure is essentially the same as that illustrated in Figures 1 and 2 with the exception that the ends of the resilient arms 19 opposite those connected to the portion 18 are provided with return bends forming the parallel extending portions 54, the ends of which are curved to conform to the curvature of the socket member as at 55. Obviously such formation will increase the area over which the resiliency of the arms 19 is distributed, thereby increasing the resiliency of the whole.

While in the foregoing there has been shown and described a preferred embodiment of this invention, it is to be understood that certain minor changes in the details in the construction, combination and arrangement of parts may be resorted to without departing from the spirit and scope of the invention as claimed.

What is claimed is:—

1. A snap fastener comprising a base having an egg shaped perforation therein, a continuous ring shaped spring having a substantially triangular closed loop, the straight portions of said loop overlying a portion of the perforation and a headed stud adapted to be entered into the perforation, said stud being engaged by the straight portions of said loop.

2. A snap fastener comprising a headed stud, a base, formed to comprise an egg-shaped opening therein, a spring having a ring shaped portion and a substantially triangular shaped closed loop portion within said ring, the straight portions of said loop overlying a portion of the perforation, and being adapted to engage the stud when the same is inserted in the perforation.

3. A snap fastener comprising a stud, a perforated base adapted to receive the stud, a spring having a ring shaped portion engaging the wall of said base and a substantially closed triangular loop, the straight portions of said loop overlying a portion of the perforation whereby, when the stud is inserted into the perforation, the spring will engage the same and a perforated cover for the base.

Signed at the city of New York, in the county and State of New York, this 27th day of August, 1920.

CHARLES READ.